United States Patent
Burnham (10) Patent No.: US 6,711,674 B1
(45) Date of Patent: Mar. 23, 2004

(54) METHOD OF WATERMARKING CONFIGURATION DATA IN AN FPGA BY EMBEDDING THE WATERMARK CORRESPONDING TO A MACRO OBTAINED UPON ENCOUNTERING A FIRST WATERMARK TAG FROM THE MACRO

(75) Inventor: James L. Burnham, Morgan Hill, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 09/513,230

(22) Filed: Feb. 24, 2000

(51) Int. Cl.[7] ............ G06F 9/00; G06F 5/177; H04L 9/00
(52) U.S. Cl. ............ 713/1; 713/2; 713/100; 713/176; 713/168
(58) Field of Search ............ 713/1, 2, 100, 713/168, 176; 716/17; 380/201; 382/100

(56) References Cited

U.S. PATENT DOCUMENTS

| | | | | |
|---|---|---|---|---|
| 5,457,408 A | * | 10/1995 | Leung | 326/38 |
| 6,345,100 B1 | * | 2/2002 | Levine | 713/176 |
| 6,421,450 B2 | * | 7/2002 | Nakano | 382/100 |
| 6,453,053 B1 | * | 9/2002 | Wakasu | 382/100 |
| 6,513,118 B1 | * | 1/2003 | Iwamura | 713/176 |
| 2001/0032318 A1 | * | 10/2001 | Yip et al. | 713/190 |

FOREIGN PATENT DOCUMENTS

| | | | | |
|---|---|---|---|---|
| JP | | 10254909 A | * 9/1998 | G06F/17/30 |

OTHER PUBLICATIONS

Bruce Schneier, "Applied Cryptography, Second Edition: Protocols, Algorithms, and Source Code in C", 1996, John Wiley & Sons, Inc., p. 226.*

Lach, Mangione-Smith, and Potkonjak, "FPGA Fingerprinting Techniques for Protecting Intellectual Property", 1998, IEEE 199 Custom Integrated Circuits Conference, Proceedings of the IEEE 1998, pp. 299–302.*

Lach, Mangione-Smith, and Potkonjak, "Signature Hiding Techniques for FPGA Intellectual Property Protection", Computer-Aided Design, 1998. ICCAD 98. Digest of Technical Papers. 1998 IEEE/ACM International Conference on, 1998, Page(s): 186–189.*

Kahng, A.B.; Lach, J.; Mangione-Smith, W.H.; Mantik, S.; Markov, I.L.; Potkonjak, M.; Tucker, P.; Wang, H.; Wolfe, G., "Watermarking Techniques for Intellectual Property Protection "Design Automation Conf., 1998. Proceedings, 1998. Page(s): 776–781.*

Xilinx, Inc., "The Programmable Logic Data Book 1999", March pp. 6–60 through 6–68.

* cited by examiner

Primary Examiner—Thomas Lee
Assistant Examiner—James K. Trujillo
(74) Attorney, Agent, or Firm—Edward S. Mao; Lois D. Cartier (57) ABSTRACT

A method is provided for watermarking FPGA configuration data. Specifically, if an end user desires to use a macro from a macro vendor, the end user creates a design file containing a marked macro received from the macro vendor, rather than the actual macro. The end user then uses an FPGA programming tool to convert the design file into configuration data. Specifically, the FPGA programming tool processes the design file to detect marked macros. If a marked macro is detected, the FPGA programming tool embeds a watermark corresponding to the macro within the configuration data.

10 Claims, 6 Drawing Sheets

METHOD OF WATERMARKING CONFIGURATION DATA IN AN FPGA BY EMBEDDING THE WATERMARK CORRESPONDING TO A MACRO OBTAINED UPON ENCOUNTERING A FIRST WATERMARK TAG FROM THE MACRO

CROSS-REFERENCE TO RELATED APPLICATIONS

This application relates to the following commonly assigned, co-pending U.S. patent applications:

1. Ser. No. 09/000,519, invented by Gary R. Lawman and entitled "DECODER STRUCTURE AND METHOD FOR FPGA CONFIGURATION", filed Dec. 30, 1997, now issued U.S. Pat. No. 6,028,445, and
2. Ser. No. 09/232,022, invented by James L. Burnham, Gary R. Lawman, and Joseph D. Linoff and entitled "METHODS TO SECURELY CONFIGURE AN FPGA TO ACCEPT SELECTED MACROS", filed Jan. 14, 1999, now issued U.S. Pat. No. 6,357,037, both of which are incorporated herein by reference.

FIELD OF THE INVENTION

The present invention relates to programmable devices such as field programmable gate arrays (FPGAs). More specifically, the present invention relates to methods for programming watermarks in an FPGA.

BACKGROUND OF THE INVENTION

Due to advancing semiconductor processing technology, integrated circuits have greatly increased in functionality and complexity. For example, programmable devices, such as field programmable gate arrays (FPGAs) and programmable logic devices (PLDs), can incorporate ever-increasing numbers of functional blocks and more flexible interconnect structures to provide greater functionality and flexibility.

Figure 1:
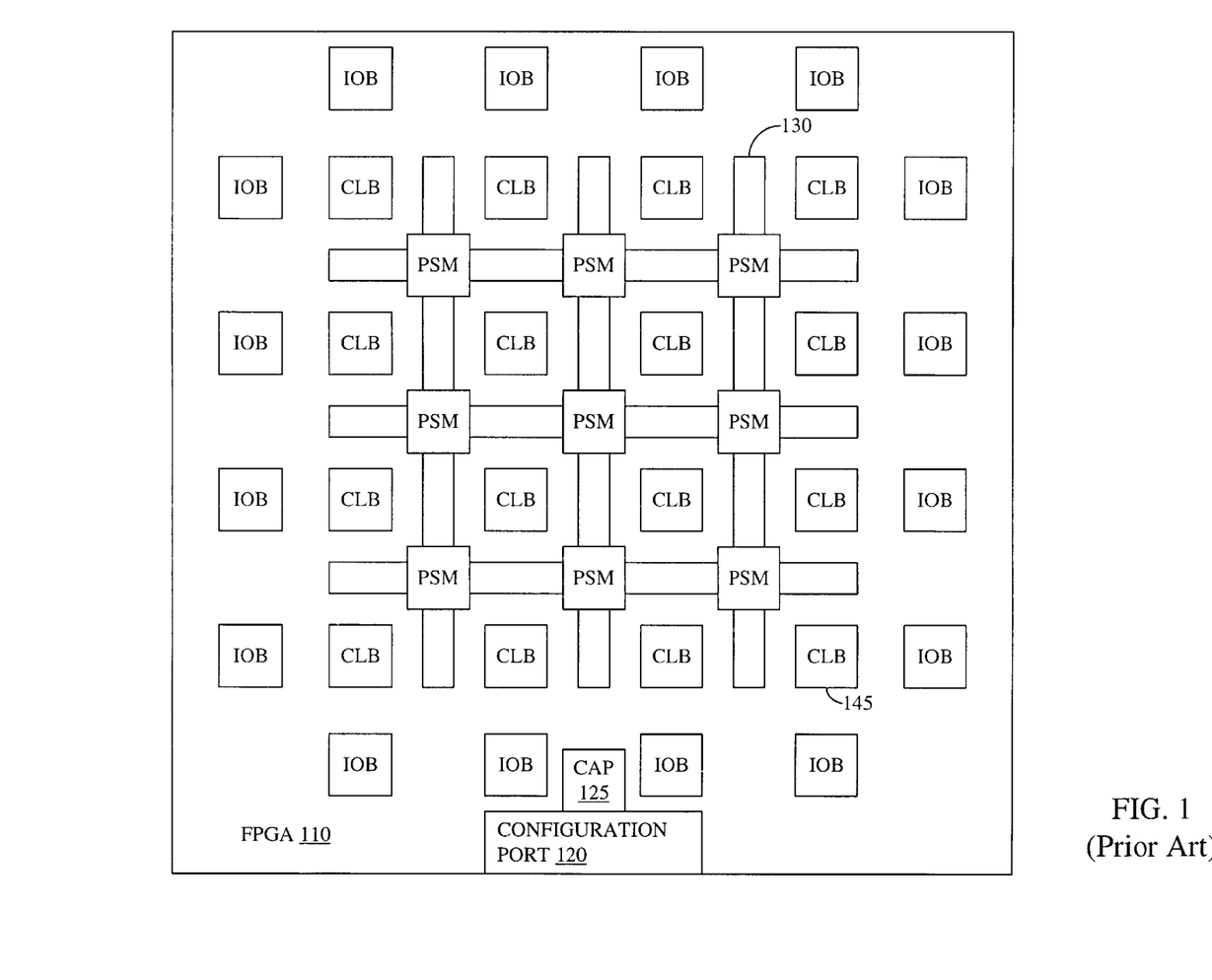
FIG. 1 is a simplified schematic diagram of a conventional FPGA.

FIG. 1 is a simplified schematic diagram of a conventional FPGA 110. FPGA 110 includes user logic circuits such as input/output blocks (IOBs), configurable logic blocks (CLBs), and programmable interconnect 130, which contains programmable switch matrices (PSMs). Each IOB and CLB can be configured through configuration port 120 to perform a variety of functions. Programmable interconnect 130 can be configured to provide electrical connections between the various CLBs and IOBs by configuring the PSMs and other programmable interconnection points (PIPS, not shown) through configuration port 120. Typically, the IOBs can be configured to drive output signals or to receive input signals from various pins (not shown) of FPGA 110.

FPGA 110 also includes dedicated internal logic. Dedicated internal logic performs specific functions and can only be minimally configured by a user. For example, configuration port 120 is one example of dedicated internal logic. Other examples may include dedicated clock nets (not shown), power distribution grids (not shown), and boundary scan logic (i.e., IEEE Boundary Scan Standard 1149.1, not shown).

FPGA 110 is illustrated with 16 CLBs, 16 IOBs, and 9 PSMs for clarity only. Actual FPGAs may contain thousands of CLBs, IOBs, and PSMs. The ratio of the number of CLBs, IOBs, and PSMs can also vary.

FPGA 110 also includes dedicated configuration logic circuits to program the user logic circuits. Specifically, each CLB, IOB, PSM, and PIP contains a configuration memory (not shown) which must be configured before each CLB, IOB, PSM, or PIP can perform a specified function. Typically, the configuration memories within an FPGA use static random access memory (SRAM) cells. The configuration memories of FPGA 110 are connected to configuration port 120 through a configuration structure (not shown) and a configuration access port (CAP) 125. Configuration port 120 (a set of pins used during the configuration process) provides an interface for external configuration devices to program the FPGA. The configuration memory is typically arranged in rows and columns. The columns are loaded from a frame register (part of the configuration structure referenced above) which is in turn sequentially loaded from one or more sequential bitstreams. In FPGA 110, configuration access port 125 is essentially a bus access point that provides access from configuration port 120 to the configuration structure of FPGA 110.

Figure 2:
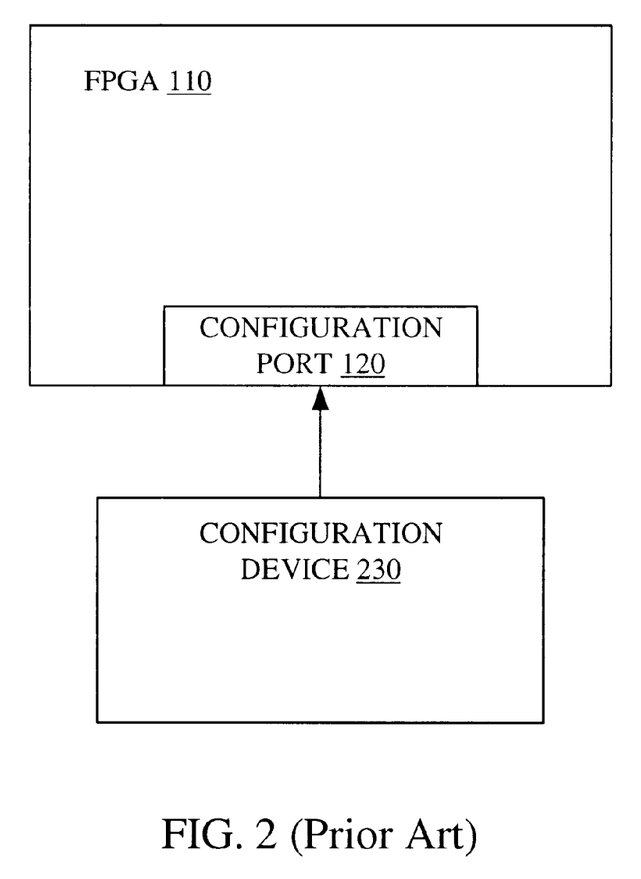
FIG. 2 is a prior art schematic diagram of an FPGA coupled to a configuration device.

FIG. 2 illustrates a conventional structure used to configure FPGA 110. Specifically, FPGA 110 is coupled to a configuration device 230 such as a serial programmable read only memory (SPROM), an electrically programmable read only memory (EPROM), or a microprocessor. Configuration port 120 receives configuration data, usually in the form of a configuration bitstream, from configuration device 230. Typically, configuration port 120 contains a set of mode pins, a clock pin, and a configuration data input pin. Configuration data from configuration device 230 is transferred serially to FPGA 110 through a configuration data input pin (not shown) in configuration port 120. In some embodiments of FPGA 110, configuration port 120 comprises a set of configuration data input pins to increase the data transfer rate between configuration device 230 and FPGA 110 by transferring data in parallel. However, due to the limited number of dedicated function pins available on an FPGA, configuration port 120 usually has a relatively small number of configuration data input pins, e.g., eight or sixteen. Further, some FPGAs allow configuration through a boundary scan chain. Specific examples for configuring various FPGAs can be found on pages 6–60 to 6–68 of "The Programmable Logic Data Book 1999" (hereinafter "The Xilinx 1999 Data Book"), published in March, 1999 by Xilinx, Inc., and available from Xilinx, Inc., 2100 Logic Drive, San Jose, Calif. 95124, which pages are incorporated herein by reference. Additional methods to program FPGAs are described by Lawman in commonly assigned, co-pending U.S. patent application Ser. No. 09/000,519, entitled "DECODER STRUCTURE AND METHOD FOR FPGA CONFIGURATION" by Gary R. Lawman, which is referenced above.

As explained above, actual FPGAs can have thousands of CLBs, IOBs, PSMs, and PIPs; therefore, the design and development of complex logic in FPGA 110 can be time-consuming and expensive. In order to simplify the design process and shorten the design cycle, many vendors provide macros for various functions that can be incorporated by an end user of the FPGA into the user's own design file. For example, Xilinx, Inc. provides a PCI interface macro, which can be incorporated by an end user into the user's design file. The user benefits from the macro because the user does not need to spend the time or resources to develop the complex logic included in the macro. Further, since the vendor profits from selling the same macro to many users, the vendor can spend the time and resources to design optimized macros. For example, the vendor strives to provide macros having high performance, flexibility, and low gate count. However, the macro vendors are reluctant to give out copies of the macros without a way of insuring that the macros are used only by licensed users. Thus, it has been proposed that FPGAs include embedded decryption circuits to decrypt encrypted macros. Alternatively, encrypted macros are decrypted prior to creation of the configuration bitstream. Both of these methods are described by Burnham et al. in commonly assigned, co-pending U.S. patent application Ser. No. 09/232,022, entitled "METHODS TO SECURELY CONFIGURE AN FPGA TO ACCEPT SELECTED MACROS" by James L. Burnham, Gary R. Lawman, and Joseph D. Linoff, which is referenced above.

However, after a configuration device, such as configuration device 230, is programmed with a configuration bitstream, non-licensed users may illegally copy the configuration bitstream in configuration device 230 and make use of the macros without compensating the macro provider and/or the creator of the configuration bitstream. One method to deter copying of configuration data is to mark the configuration data with markers, also known as watermarks, within the configuration data stored in configuration device 230. Thus, if a macro provider suspects that a third party is using a macro without authorization, the macro provider can obtain a copy of the suspect configuration device and check for the watermark in the configuration bitstream to determine if the suspect configuration device contains the macro. Hence, there is a need for a method to watermark an FPGA macro in a configuration bitstream.

SUMMARY

The present invention watermarks FPGA macros in configuration data so a macro provider can identify configuration data that includes a specific macro. Specifically, an end user creates a design file by incorporating a marked macro in the end user's FPGA design file. The end user then uses an FPGA programming tool that is designed to detect marked macros and obtain watermarks from the marked macro, from the macro vendor, or from a watermark manager. The FPGA programming tool converts the design file into configuration data, which incorporates the macro and a watermark which identifies the macro. In one embodiment, the FPGA programming tool stores the watermark in unused portions of the configuration data. For example, the watermark may be stored in reserved locations of the configuration data, or in locations corresponding to unused user logic circuits. In some embodiments of the present invention, the marked macro reserves more user logic circuits than necessary, to ensure that unused logic is available for storing the watermark in the configuration data.

The macro vendor provides marked macros to the end user. The marked macros cannot be used in an FPGA unless the FPGA programming tool is configured to embed watermarks corresponding to the macro in the resulting configuration data. In some embodiments of the present invention, marked macros include a watermark tag. When the FPGA programming tool parses the marked macro and encounters a watermark tag, the FPGA programming tool obtains the watermark for the marked macro from the macro vendor or a watermark manager over a secure medium such as a telephone line or a secure channel of a wired or wireless network. By using watermark tags, a macro vendor can better track the use of the marked macro. For example, the vendor can supply a license manager that checks for the presence of watermarks and tracks macro usage. The present invention will be more fully understood in view of the following description and drawings.

DETAILED DESCRIPTION

Figure 3:
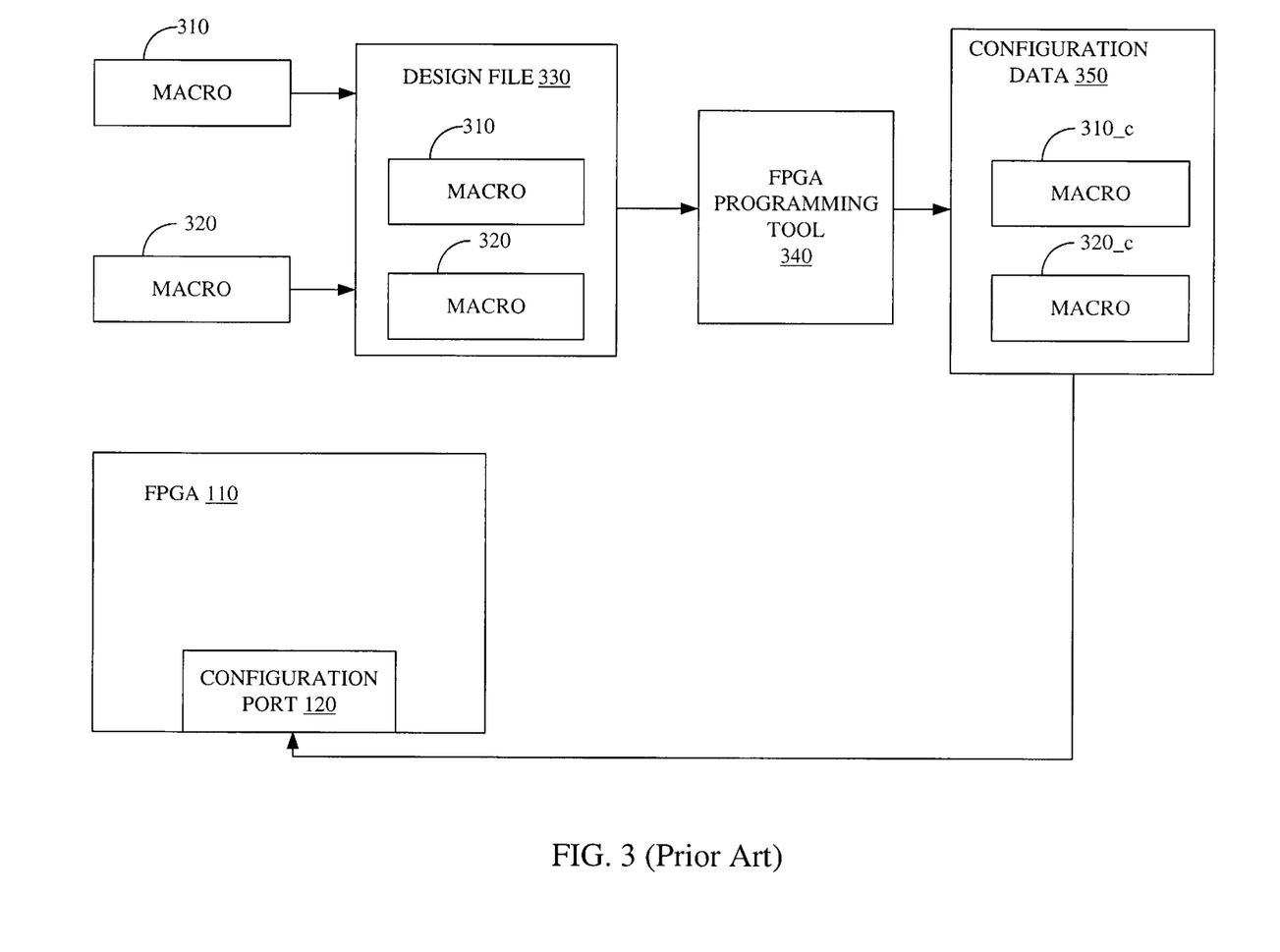
FIG. 3 illustrates a prior art method of programming an FPGA using macros.

FIG. 3 illustrates a conventional manner of configuring an FPGA using macros. In FIG. 3, an end user (not shown) desires to program FPGA 110 with a macro 310 and a macro 320. Typically, the end user creates a design file 330, which includes macro 310 and macro 320. Design file 330 is converted into configuration data 350 by an FPGA programming tool 340. Configuration data 350 contains converted macros 310_c and 320_c, which are the converted versions of macros 310 and macro 320, respectively. Configuration data 350 typically takes the form of a configuration bitstream. Note that configuration data 350 also includes configuration data corresponding to the user logic circuits defined by the end user in design file 330. Thus, configuration data 350 includes macro configuration bits corresponding to converted macros 310_c and 320_c as well as user configuration bits. Configuration data 350 is typically stored in a configuration device (such as configuration device 230 in FIG. 2). Configuration data 350 is sent into FPGA 110 through configuration port 120 to configure FPGA 110. As stated above, the macro vendors providing macros 310 and 320 may not wish to make macro 310 and macro 320 easily available due to fear of unlicensed use.

Conventional methods to watermark macros typically involve manipulating design file 330 to create extraneous logic that serves no purpose in FPGA 110. Alternatively, false paths (i.e., interconnect paths not needed in the user logic circuit) are created in FPGA 110 that would never be used by actual data, or logic states are defined that are never entered when the user logic circuit is in normal operation (false states). However, specific test data can cause FPGA 110 to enter a false state, or to enter a state using these false paths, to indicate the presence of a specific macro. These methods typically modify the user logic circuits of the FPGA, which may cause undesirable side effects. The user logic circuits should be tested to ensure that there are no undesirable side effects from the presence of these false paths and/or false states. In accordance with one embodiment of the present invention, watermarking of configuration data is performed after the configuration data for the user logic circuits of the FPGA are embedded in the configuration data.

Figure 4A:
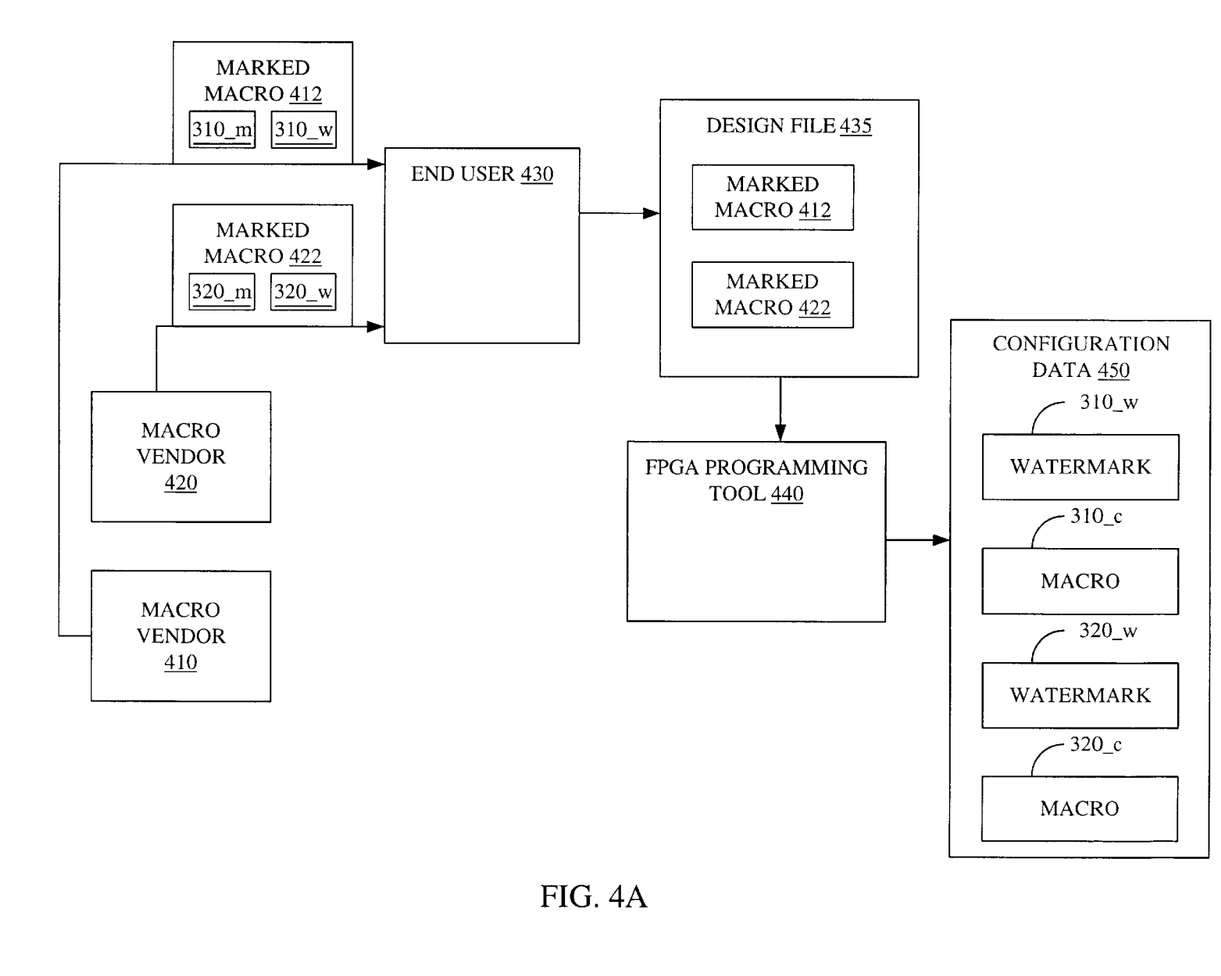
FIG. 4A illustrates a first method of programming an FPGA in accordance with the present invention.
Figure 4B:
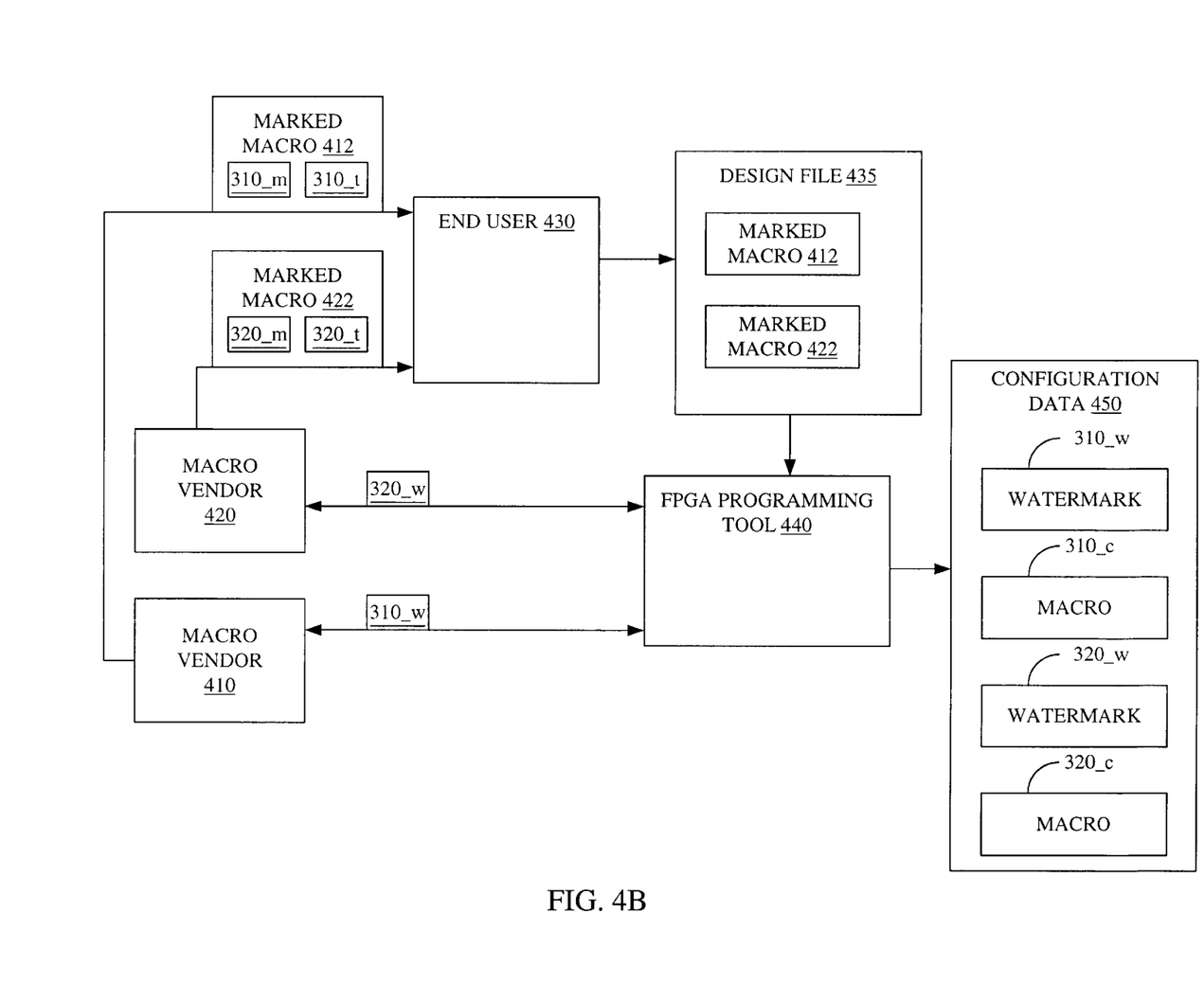
FIG. 4B illustrates a second method of programming an FPGA in accordance with the present invention.

FIGS. 4A and 4B illustrate methods to program macros into FPGAs with watermarks in accordance with first and second embodiments of the present invention. In FIGS. 4A and 4B, an end user 430 wishes to configure an FPGA using macro 310 from macro vendor 410 and macro 320 from a macro vendor 420. Instead of providing a copy of macro 310, macro vendor 410 provides a marked macro 412 to end user 430. Similarly, macro vendor 420 provides a marked macro 422 to end user 430 instead of providing macro 320. In one embodiment of the present invention marked macros are transferred as Java™ archive files, which can be encrypted. Other embodiments may use other compression or encryption standards such as ZIP, TAR, and so forth.

In the embodiment of FIG. 4A, marked macro 412 contains a watermark 310_w identifying macro 310 and a version 310_m of macro 310, in addition to other information regarding macro 310 that can be used by end user 430 to create and test a design file incorporating macro 310. For example, marked macro 412 may contain information regarding the FPGA resources (e.g., CLBs, IOBs, PSMs) required by macro 310. Furthermore, marked macro 412 may contain information regarding how circuits designed by end user 430 can interface to the circuits defined by macro 310. In some embodiments, marked macro 412 also contains information for simulating the circuits defined by macro 310 so that end user 430 can simulate the design file containing marked macro 412. Marked macro 422 may contain similar information regarding macro 320. Typically, macro 310_m in marked macro 412 is encrypted so that only FPGA programming tools configured to embed watermarks in the configuration data can create converted macros 310_c and 320_c. The specific encryption schemes used for marked macros 412 and 422 are not an integral part of the present invention. Virtually any encryption method can be used.

End user 430 creates a design file 435 in a conventional manner; however, in this case design file 435 contains marked macro 412 and marked macro 422. End user 430 then uses an FPGA programming tool 440 to convert design file 435 into configuration data 450, which contains converted macros 310_c and 320_c as well as watermarks 310_w and 320_w. During the conversion of design file 435 into configuration data 450, FPGA programming tool 440 is configured to locate marked macros in design file 435. When FPGA programming tool 440 identifies watermark 310_w in marked macro 412, FPGA programming tool 440 saves watermark 310_w and processes marked macro 412 to embed converted macro 310_c in configuration data 450. As additional marked macros are located and processed, FPGA programming tool 440 stores the various watermarks while. embedding the converted macros and other user logic in configuration data 450. After all macros and user logic are defined in configuration data 450, FPGA programming tool 440 embeds the stored watermarks into configuration data 450. Thus, in the specific example of FIG. 4A, configuration data 450 includes converted macros 310_c and 320_c as well as watermarks 310_w and 320_w.

Before FPGA programming tool 440 embeds watermarks 310_w and 320_w into configuration data 450, configuration data 450 contains only macro configuration bits and user configuration bits. Thus, at this point, configuration data 450 is substantially similar to configuration data 350 (FIG. 3). In accordance with one embodiment of the present invention, FPGA programming tool 440 embeds watermarks 310_w and 320_w in unused portions of configuration data 450. For clarity, watermarks are stored as watermark bits in configuration data 450. Specifically, the unused portion of configuration data 450 corresponds to unused user logic and reserved locations of the configuration data.

Unused user logic circuits could be CLBs, IOBs, or PSMs that are not required by design file 435. For example, design file 435 may not require the-use of CLB 145 (FIG. 1). Thus, FPGA programming tool 440 can embed a watermark in the portion of configuration data used to define the functionality of CLB 145. In accordance with another embodiment of the present invention, a marked macro reserves more user logic circuits than actually required by the macro's logic functions to create unused user logic circuits, which are later used to store the watermark associated with the marked macro.

Reserved locations in the configuration data are typically set aside by the manufacturers of the FPGA for future products having greater programmability. For example, a CLB may only require 20 bits to configure. However, in the actual configuration bitstream, 25 bits may be set aside for each CLB in case a future product contains CLBs requiring more configuration bits. The 5 extra bits of each CLB are reserved locations in the configuration data that can be used by FPGA programming tool 440 to embed a watermark.

The embodiment of FIG. 4B is similar to the embodiment of FIG. 4A, therefore, only the differences are described in detail. In the embodiment of FIG. 4B, marked macro 412 contains a watermark tag 310_t rather than watermark 310_w. Similarly, marked macro 422 contains watermark tag 320_t rather than watermark 320_w. When FPGA programming tool 440 identifies a watermark tag, FPGA programming tool 440 contacts the macro vendor that created the marked macro (i.e., macro vendor 410) over a secure medium such as a telephone line or a secured channel of a public or private network, to obtain the appropriate watermark (i.e., watermark 310_w). Use of watermark tags rather than watermarks allows the macro vendor to track each use of the marked macro. Furthermore, some embodiments of FPGA programming tool 440 identify the end user using the marked macro. Thus, a macro vendor using watermark tags can distribute one version of a marked macro to multiple users and provide different watermarks based on the identity of the user. Some design files may contain marked macros containing watermarks as well as marked macros containing watermark tags. In one embodiment, FPGA programming tool 440 is a Java™ applet that communicates with macro vendors using encrypted channels over the internet.

Figure 5:
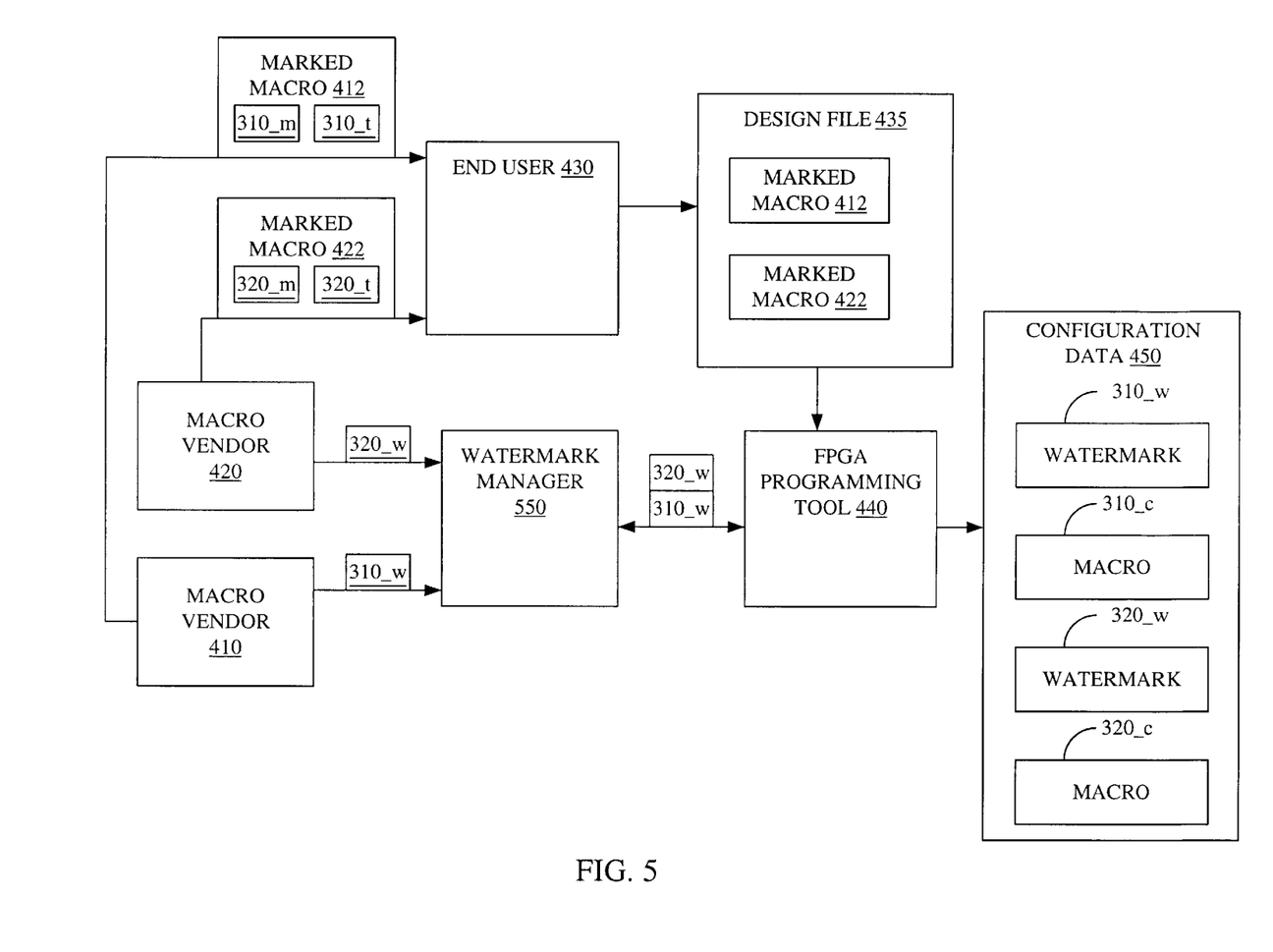
FIG. 5 illustrates a third method of programming an FPGA in accordance with the present invention.

FIG. 5 illustrates a method to program macros into FPGAs with watermarks in accordance with another embodiment of the present invention. Since the method of FIG. 5 is similar to the method of FIG. 4B, only the differences between the methods are described in detail. Specifically, for the method of FIG. 5, FPGA programming tool 440 contacts a watermark manager 550 rather than macro vendors 410 and 420. Watermark manager 550 provides appropriate watermarks for FPGA programming tool 440 for marked macros 422 and 412. Watermark manager 550 manages the watermarks for marked macros for a variety of macro vendors, such as macro vendors 410 and 420. Thus, each end user need only contact a single entity during creation of configuration data 450.

In the various embodiments of this invention, methods and structures have been described to securely mark third party macros. Only marked versions of the macros are released to end users. To use the marked macros, an end user must use an FPGA programming tool that embeds a watermark in the resulting configuration data. Thus, unlicensed use of the macro is diminished. By providing methods to minimize unlicensed use of macros, macro vendors are motivated to expend the time and effort to create large libraries of optimized macros to sell to end users. Thus, the cost and time for creating design files for FPGAs by an end user can be reduced through the use of macros from macro vendors.

The various embodiments of the structures and methods of this invention that are described above are illustrative only of the principles of this invention and are not intended to limit the scope of the invention to the particular embodiments described. For example, in view of this disclosure, those skilled in the art can define other design files, marked macros, macros, encryption algorithms, configuration devices, programming tools, FPGAs, CLBs, IOBs, PSMs, configuration access ports, configuration ports, and so forth, and use these alternative features to create a method, circuit, or system according to the principles of this invention. Thus, the invention is limited only by the following claims.

What is claimed is:

1. A method to create configuration data for an FPGA comprising:

creating a design file incorporating a first marked macro having a first watermark tag;

obtaining, on encountering the first watermark tag, a first watermark corresponding to the first macro from a first macro vendor;

converting the design file into configuration data, wherein the configuration data incorporates a first converted macro corresponding to the first macro; and embedding the first watermark corresponding to the first macro in unused and reserved portions of the configuration data.

2. The method of claim 1, further comprising obtaining the first marked macro from a first macro vendor.

3. The method of claim 1, wherein the first watermark is obtained over a telephone line.

4. The method of claim 1, wherein the first watermark is obtained over a secured channel of a network.

5. The method of claim 1, further comprising programming the FPGA with the configuration data.

6. The method of claim 1, further comprising incorporating a second marked macro having a second watermark tag in the design file.

7. The method of claim 6, wherein the configuration data incorporates a second converted macro corresponding to the second macro.

8. The method of claim 1, wherein the first marked macro is an archive file.

9. The method of claim 1, wherein the first marked macro is a file that has been subjected to at least one of encoding, compressing, and encrypting.

10. A method to create configuration data for an FPGA comprising:

creating a design file incorporating a first marked macro;

converting the design file into configuration data, wherein the configuration data incorporates a first converted macro corresponding to the first macro; and embedding a first watermark corresponding to the first macro in the configuration data, wherein embedding a first watermark comprises storing the first watermark in unused portions of the configuration data, and wherein the unused portions of the configuration data are reserved locations in the configuration data.

* * * * *